United States Patent
DeFelice et al.

(10) Patent No.: US 10,926,432 B2
(45) Date of Patent: Feb. 23, 2021

(54) POLYMER POWDER AND METHOD OF USING THE SAME

(71) Applicant: Hexcel Corporation, Stamford, CT (US)

(72) Inventors: Scott DeFelice, Holyoke, MA (US); Anthony DeCarmine, Lebanon, CT (US)

(73) Assignee: Hexcel Corporation, Stamford, CT (US)

( * ) Notice: Subject to any disclaimer, the term of this patent is extended or adjusted under 35 U.S.C. 154(b) by 343 days.

(21) Appl. No.: 15/872,478

(22) Filed: Jan. 16, 2018

(65) Prior Publication Data

US 2018/0200922 A1    Jul. 19, 2018

Related U.S. Application Data

(60) Provisional application No. 62/446,460, filed on Jan. 15, 2017, provisional application No. 62/446,470, filed on Jan. 15, 2017, provisional application No. 62/446,462, filed on Jan. 15, 2017, provisional application No. 62/446,464, filed on Jan. 15, 2017.

(51) Int. Cl.

| | |
|---|---|
| *C08G 65/46* | (2006.01) |
| *B29B 9/16* | (2006.01) |
| *B33Y 70/00* | (2020.01) |
| *B29C 64/153* | (2017.01) |
| *B02C 23/10* | (2006.01) |
| *B33Y 10/00* | (2015.01) |
| *C08G 65/40* | (2006.01) |
| *C08J 3/12* | (2006.01) |
| *C08J 5/04* | (2006.01) |
| *C08L 71/12* | (2006.01) |
| *B29K 71/00* | (2006.01) |

(52) U.S. Cl.
CPC ............... *B29B 9/16* (2013.01); *B02C 23/10* (2013.01); *B29C 64/153* (2017.08); *B33Y 10/00* (2014.12); *B33Y 70/00* (2014.12); *C08G 65/4012* (2013.01); *C08G 65/46* (2013.01); *C08J 3/12* (2013.01); *C08J 5/042* (2013.01); *C08L 71/12* (2013.01); *B29B 2009/168* (2013.01); *B29K 2071/00* (2013.01); *C08G 2650/40* (2013.01); *C08J 2371/10* (2013.01)

(58) Field of Classification Search
CPC ........ C08G 65/46; C08G 65/4102; B29B 9/16
See application file for complete search history.

(56) References Cited

U.S. PATENT DOCUMENTS

| | | |
|---|---|---|
| 3,065,205 A | 11/1962 | Bonner, Jr. |
| 3,441,538 A | 4/1969 | Marks |
| 3,442,857 A | 5/1969 | Thornton |
| 3,516,966 A | 6/1970 | Berr |
| 4,540,630 A | 9/1985 | Wegner et al. |
| 4,704,448 A | 11/1987 | Brugel |
| 4,816,556 A | 3/1989 | Gay et al. |
| 4,897,286 A | 1/1990 | Kosuda et al. |
| 5,041,335 A | 8/1991 | Inai et al. |
| 6,177,518 B1 | 1/2001 | Lahijani |
| 8,765,265 B2 | 7/2014 | Kyomoto et al. |
| 9,587,107 B2 * | 3/2017 | Bertelo .................. C08G 8/02 |
| 9,937,667 B2 | 4/2018 | DeFelice et al. |
| 2005/0207931 A1 | 9/2005 | Hesse et al. |
| 2008/0258330 A1 * | 10/2008 | Muller ................... B33Y 70/00 264/113 |
| 2013/0323416 A1 * | 12/2013 | Bertelo ................. B33Y 70/00 427/180 |
| 2017/0198134 A1 * | 7/2017 | Bertelo ................. B29C 64/153 |

FOREIGN PATENT DOCUMENTS

| | | |
|---|---|---|
| WO | 2014037375 A1 | 3/2014 |
| WO | 2014100320 A1 | 6/2014 |
| WO | 2015031758 A1 | 3/2015 |

OTHER PUBLICATIONS

European Search Report Application No. EP 18 18 2749 Completed: Nov. 16, 2018;dated Nov. 30, 2018 11 pages.
U.S. Office Action U.S. Appl. No. 15/872,598 dated Sep. 19, 2019 8 Pages.
Cheng, Z. D., et al., "Polymorphism and crystal structure identification in poly(aryl ether ketone ketone)s", Macromol. Chem. Phys. 197, 185-213, (1996).

* cited by examiner

*Primary Examiner* — Margaret G Moore
(74) *Attorney, Agent, or Firm* — Welsh IP Law LLC

(57) ABSTRACT

A method for preparing a PEKK powder for use in SLS includes the steps of: providing a raw, non-powder PEKK material; heat treating the raw PEKK to evaporate at least substantially all of a liquid solvent in the raw PEKK, causing at least substantially all of the raw PEKK to be in the form of irregularly-shaped particles; cooling the raw PEKK; and grinding the raw PEKK to form a PEKK powder.

16 Claims, 6 Drawing Sheets

POLYMER POWDER AND METHOD OF USING THE SAME

CROSS-REFERENCE TO RELATED APPLICATIONS

This application claims the benefit of U.S. Provisional Application No. 62/446,470, filed Jan. 15, 2017, U.S. Provisional Application No. 62/446,460, filed Jan. 15, 2017; U.S. Provisional Application No. 62/446,462, filed Jan. 15, 2017; and U.S. Provisional Application No. 62/446,464, filed Jan. 15, 2017. The contents of these prior applications are incorporated herein by reference in their entirety.

TECHNICAL FIELD

The present disclosure generally relates to additive manufacturing technology and techniques, and more specifically relates to a polyether ketone ketone ("PEKK") copolymer powder for use in selective laser sintering ("SLS" or "LS"), a method for preparing the PEKK copolymer powder (hereinafter "PEKK powder"), and a method for additively manufacturing an object using the PEKK powder.

BACKGROUND

It is known to use additive manufacturing technology and techniques, together with polymer powders, to manufacture high-performance products having applications in various industries (e.g., aerospace, industrial, medical, etc.).

SLS is an additive manufacturing technique that uses electromagnetic radiation from a laser to selectively fuse a powder material into a desired 3-D object. The laser selectively fuses the powder material by scanning cross-sectional layers generated from a 3-D digital description of the desired object onto the top layer of a bed of the powder material. After a cross-sectional layer is scanned, the powder bed is lowered by one layer thickness in a z-axis direction, a new top layer of powder material is applied to the powder bed, and the powder bed is rescanned. This process is repeated until the object is completed. When completed, the object is formed in a "cake" of unfused powder material. The formed object is extracted from the cake. The powder material from the cake can be recovered, sieved, and combined with unused powder material and used in a subsequent SLS process.

PEKK powders are of particular interest in the SLS process because objects that have been manufactured from PEKK powders are characterized by a low flammability, good biocompatibility, and a high resistance against hydrolysis and radiation. The thermal resistance at elevated temperatures as well as the chemical resistance distinguishes PEKK powders from ordinary plastic powders.

An SLS machine typically pre-heats the PEKK powder disposed on the powder bed to a temperature proximate to a melting point of the powder. Pre-heating the PEKK powder makes it easier for the laser to raise the temperature of PEKK powder to a fusing point, and inhibits unwanted distortions in formed objects during cooling. Techniques for pre-heating of PEKK powders are discussed, for example, in U.S. patent application Ser. No. 14/472,817, filed Aug. 29, 2014.

There is an ever-increasing need to manufacture objects via SLS using PEKK powders with improved strengths (e.g., improved tensile strengths in the z-axis direction), improved shape accuracies, and with fewer or no structural flaws (e.g., flaws due to improperly fused layers).

Aspects of the present invention are directed to these and other problems.

SUMMARY

Aspects of the present invention relate to the discovery that one or more of the above-described problems can be overcome by heat treating raw PEKK copolymer material (hereinafter "raw PEKK"), rather than pre-heating PEKK powder as is typically done in the art. The heat-treated raw PEKK copolymer material is subsequently ground down to form a PEKK powder. The particles of the PEKK powder are irregularly-shaped in comparison to the spherical-shaped particles of prior art PEKK powders that are pre-heated as described above.

The irregularly-shaped PEKK powder particles pack together more rigidly than prior art spherical-shaped PEKK powder particles. It is believed that the greater stability of bed packing allows better shape accuracy in general, and possibly more resistance to machine transients that would otherwise cause distortions in the manufactured object. It is also believed that the shapes (e.g., size, shape distributions) of voids created by irregularly-shaped PEKK powder particles versus those of spherical-shaped PEKK powder particles offer a different mode of consolidation, yielding enhanced consistency of performance and possibly improved performance.

According to an aspect of the present invention, a method for preparing a PEKK powder for use in SLS includes the steps of: providing a raw, non-powder PEKK material; heat treating the raw PEKK to evaporate at least substantially all of a liquid solvent in the raw PEKK, causing at least substantially all of the raw PEKK to be in the form of irregularly-shaped particles; cooling the raw PEKK; and grinding the raw PEKK to form a PEKK powder.

According to another aspect of the present invention, a PEKK powder is provided that is manufactured according to a method comprising: providing a raw, non-powder PEKK material; after the providing step, heat treating the raw PEKK to evaporate at least substantially all of a liquid solvent in the raw PEKK, causing at least substantially all of the raw PEKK to be in the form of irregularly-shaped particles; after the heat treating step, cooling the raw PEKK; and after the cooling step, grinding the raw PEKK to form a PEKK powder.

According to another aspect of the present invention, a method for preparing a PAEK powder for use in LS includes the steps of: providing a raw, non-powder PAEK material; heat treating the raw PAEK to evaporate at least substantially all of a liquid solvent in the raw PAEK, causing at least substantially all of the raw PAEK to be in the form of irregularly-shaped particles; cooling the raw PAEK; and grinding the raw PAEK to form a PAEK powder.

In addition to, or as an alternative to, one or more of the features described above, further aspects of the present invention can include one or more of the following features, individually or in combination:

the method further includes the step of sieving the PEKK powder to eliminate particles having sizes outside a range of 30-150 µm;

the irregularly-shaped particles of the raw PEKK have grain sizes that are orders of magnitude larger than 150 µm;

before the heat treating step, the raw PEKK is of a gel or gel-like form;

the temperature of the raw PEKK does not exceed 250° C. during the heat treating step;

the heat treating step includes: (i) a first heating period having a duration of at least one hour, during which the temperature of the raw PEKK is ramped up from room temperature to approximately 200° C., (ii) a second heating period having a duration of several hours, during which the temperature of the raw PEKK is held at a temperature of approximately 200° C., the heat treating step further includes: (i) a third heating period during which the temperature of the raw PEKK is ramped up from approximately 200° C. to approximately 225° C.; (ii) a fourth heating period having a duration of at least one hour, during which the temperature of the raw PEKK is held at a temperature of approximately 225° C.;

the heat treating step further includes: (i) a fifth heating period during which the temperature of the raw PEKK is ramped up from approximately 225° C. to approximately 250° C., (ii) a sixth heating period having a duration of at least one hour, during which the temperature of the raw PEKK is held at a temperature of approximately 250° C., the heat treating step includes: (i) a first heating period having a duration of one (1) hour, during which the temperature of the raw PEKK is ramped up from room temperature to approximately 200° C.; (ii) a second heating period having a duration of seven (7) hours, during which the temperature of the raw PEKK is held at a temperature of approximately 200° C.; (iii) a third heating period having a duration of 0; 5 hours, during which the temperature of the raw PEKK is ramped up from approximately 200° C. to approximately 225° C.; (ii) a fourth heating period having a duration of 1; 5 hours, during which the temperature of the raw PEKK is held at a temperature of approximately 225° C.; (i) a fifth heating period having a duration of 0; 5 hours, during which the temperature of the raw PEKK is ramped up from approximately 225° C. to approximately 250° C.; and (ii) a sixth heating period having a duration of two (2) hours, during which the temperature of the raw PEKK is held at a temperature of approximately 250° C.;

the heat treating step includes: (i) a first heating period having a duration of 0; 5 hours, during which the temperature of the raw PEKK is ramped up from room temperature to approximately 200° C.; (ii) a second heating period having a duration of four (4) hours, during which the temperature of the raw PEKK is held at a temperature of approximately 200° C.; (iii) a third heating period having a duration of 0; 5 hours, during which the temperature of the raw PEKK is ramped up from approximately 200° C. to approximately 225° C.; (ii) a fourth heating period having a duration of 4 hours, during which the temperature of the raw PEKK is held at a temperature of approximately 225° C.; (i) a fifth heating period having a duration of 0; 5 hours, during which the temperature of the raw PEKK is ramped up from approximately 225° C. to approximately 250° C., (ii) a sixth heating period having a duration of five (5) hours, during which the temperature of the raw PEKK is held at a temperature of approximately 250° C.;

the heat treating step involves placing the raw PEKK into a pan and heating both the raw PEKK and the pan within a convection oven;

the cooling step is performed by allowing the raw PEKK to cool only naturally;

the heating step causes coalescence of the irregularly-shaped particles of the raw PEKK; and at least substantially all particles of the PEKK powder are at least several degrees of magnitude smaller than at least substantially all particles of the raw PEKK.

These and other aspects of the present invention will become apparent in light of the drawings and detailed description provided below.

DETAILED DESCRIPTION

Figure 1:
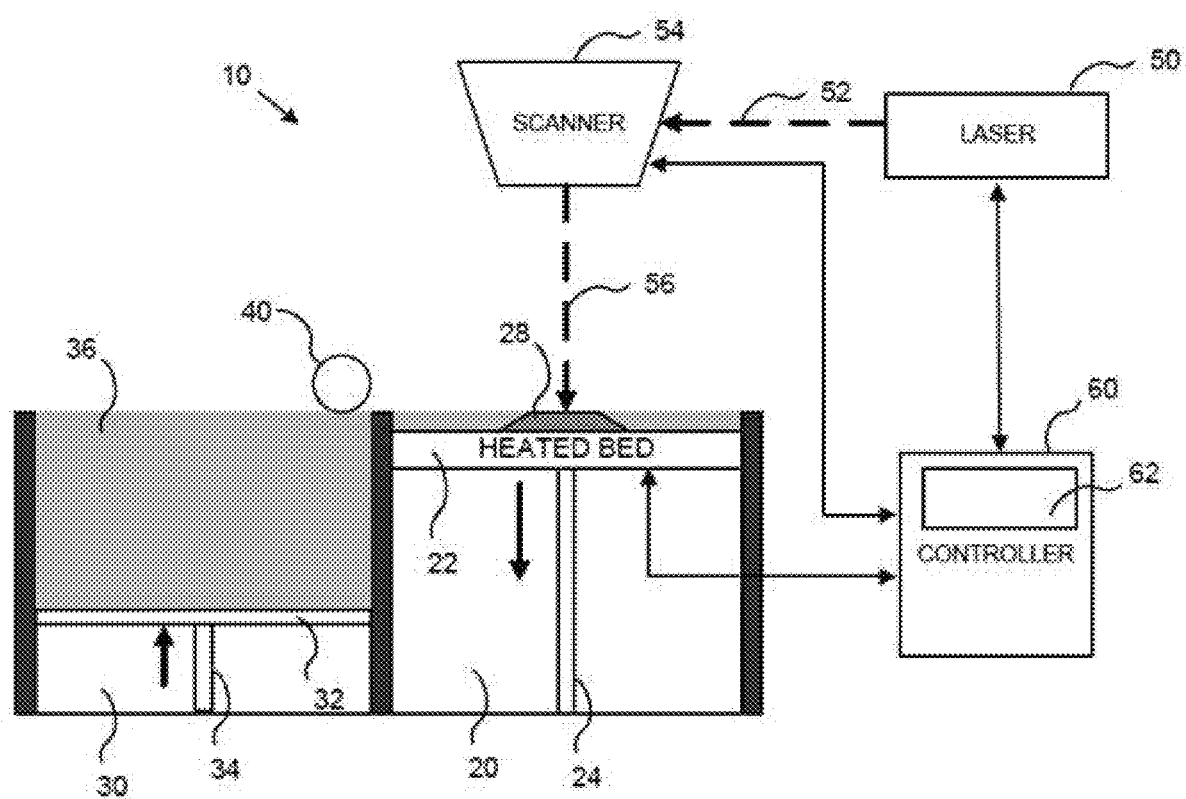
FIG. 1 illustrates an SLS machine.

An aspect of the present invention involves a method for preparing polymer powders for SLS or LS.

One class of polymer powders is polyaryletherketones ("PAEK") polymers. PAEKs are of interest in the SLS process because parts that have been manufactured from PAEK powder or PAEK granulates are characterized by a low flammability, a good biocompatibility, and a high resistance against hydrolysis and radiation. The thermal resistance at elevated temperatures as well as the chemical resistance distinguishes PAEK powders from ordinary plastic powders. A PAEK polymer powder may be a powder from the group consisting of polyetheretherketone ("PEEK"), polyetherketoneketone ("PEKK"), polyetherketone ("PEK"), polyetheretherketoneketone ("PEEKK") or polyetherketoneetherketoneketone ("PEKEKK").

More specifically, the method if useful for preparing PEKK polymers powders for use in LS. PEKKs are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

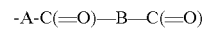

-A-C(=O)—B—C(=O)    I

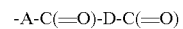

-A-C(=O)-D-C(=O)    II where A is a p,p'-Ph-O-Ph-group, Ph is a phenylene radical, B is p-phenylene, and D is m-phenylene. The Formula I:Formula II isomer ratio, commonly referred to as the T:I ratio, in the PEKK is selected so as to vary the total crystallinity of the polymer. The T:I ratio is commonly varied from 50:50 to 90:10, and in some embodiments 60:40 to 80:20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in, for example, Cheng, Z. D. et al, "Polymorphism and crystal structure identification in poly(aryl ether ketone ketone)s," Macromol. Chem. Phys. 197, 185-213 (1996), the disclosure of which is hereby incorporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II, are observed. Form I can be produced when samples are crystallized from melting at low supercoolings, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a form III.

Suitable PEKKs are available from several commercial sources under various brand names. For example, polyetherketoneketones are sold under the brand name OXPEKK® polymers by Oxford Performance Materials, South Windsor, Conn., including OXPEKK®-C, OXPEKK®-CE, OXPEKK®-D and OXPEKK®-SP, OXPEKK®-N, OXPEKK®-ESD polymers. Polyetherketoneketone polymers are also manufactured and supplied by Arkema. In addition to using polymers with a specific T:I ratio, mixtures of polyetherketoneketones may be employed.

Although the present disclosure is provided in reference to PAEK polymers, and more specifically PEKK polymers, the present disclosure is not so limited. A person of ordinary skill in the art and familiar with this disclosure would understand that aspects of the present invention could be employed with other types of polymers useful in LS and with other materials useful in LS, including, but not limited to, metals and ceramics.

In reference to FIG. 1, an example of an LS system 10 is illustrated that includes a first chamber 20 having an actuatable piston 24 disposed therein. A bed 22 is disposed at an end of the piston 24. It should be understood that the term bed refers to the physical structure supported on the piston or the uppermost layer of powder disposed thereon. The temperature of the bed 22 can be variably controlled via a controller 60 in communication with heating elements (not shown) in and or around the bed 22. A second chamber 30 is adjacent to the first chamber 20. The second chamber 30 includes a table surface 32 disposed on an end of a piston 34 disposed therein. A powder 36 for use in the LS system 10 is stored in the second chamber 30 prior to the sintering step.

During operation of the LS system 10, a spreader 40 translates across a top surface of the first chamber 20, evenly distributing a layer of powder 36 across either the top surface of the bed 22, or the material previously disposed on the bed 22. The LS system 10 preheats the powder material 36 disposed on the bed 22 to a temperature proximate to a melting point of the powder. Typically, a layer of powder is spread to have a thickness of 125 µm, however the thickness of the layer of powder can be increased or decreased depending on the specific LS process and within the limits of the LS system.

A laser 50 and a scanning device 54 are disposed above the bed 22. The laser 50 transmits a beam 52 to the scanner 54, which then distributes a laser beam 56 across the layer of powder 36 disposed on the bed 22 in accordance with a build data. The laser selectively fuses powdered material (e.g., PEKK powder prepared according to the presently disclosed method) by scanning cross-sections generated from a three-dimensional digital description of the part on the surface of the bed having a layer of the powdered material disposed thereon. The laser 50 and the scanner 54 are in communication with the controller 60. After a cross-section is scanned, the bed 22 is lowered by one layer thickness (illustrated by the downward arrow), a new layer of powdered material is disposed on the bed 22 via the spreader 40, and the bed 22 is rescanned by the laser. This process is repeated until a build 28 is completed. During this process, the piston 34 in the second chamber is incrementally raised (illustrated by the upward arrow) to ensure that there is a sufficient supply of powder 36.

The steps of the present method for preparing a PAEK powder (e.g., a PEKK powder) for use in SLS will now be discussed.

Figure 2:
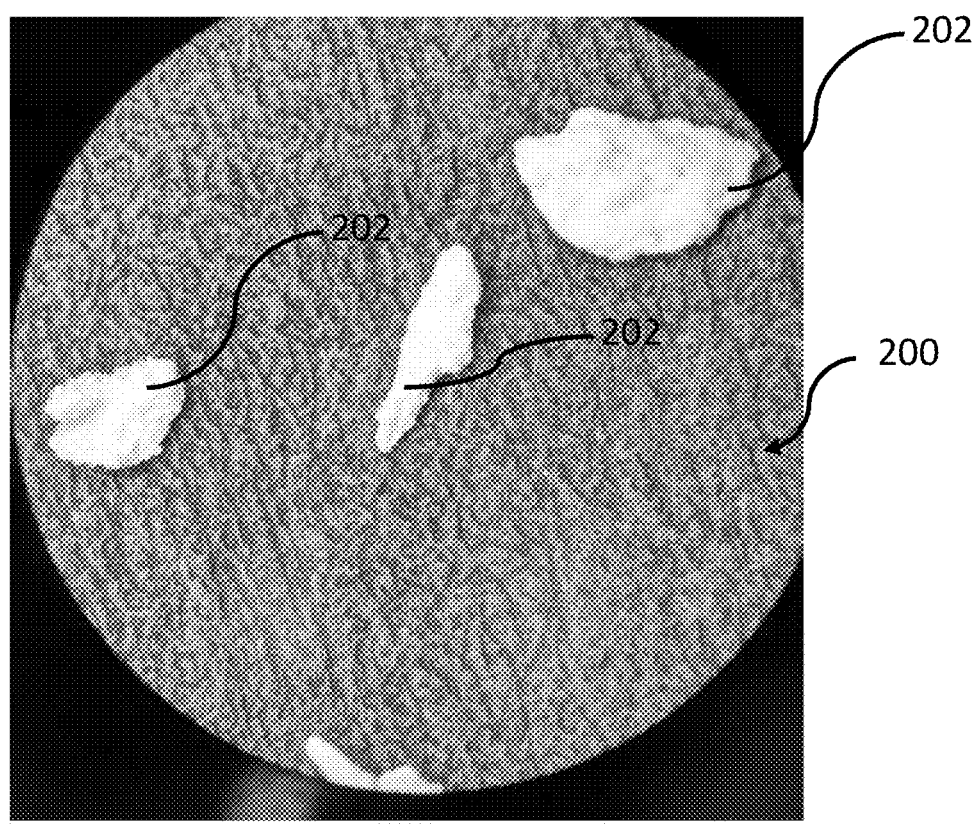
FIG. 2 is an image showing a magnified view of raw PEKK flakes.

First, raw PEKK is provided. The raw PEKK is commercially available from companies such as Arkema, Inc. of King of Prussia, Pa., and Cytec Industries Inc. of Woodland Park, N.J. The raw PEKK is typically swilled from a chemical reactor and then washed. The raw PEKK is a non-powder material. That is, the raw PEKK is not in the form of a powder. As shown in FIG. 2, the raw PEKK 200 is in the form of irregularly-shaped particles 202 (e.g., particles that are vaguely round, elongated, flat, etc.) and has an appearance similar to that of Rice Krispies® cereal. The irregularly-shaped particles of the raw PEKK have grain sizes that are orders of magnitude larger than 150 µm, for example. The remainder of the raw PEKK can be in the form of a gel or gel-like form caused by an amount of liquid solvent (e.g., orthodichlorobenzene (ODCB)) other solvents and volatiles remaining from the process of producing the raw PEKK.

After the step of providing the raw PEKK, a heat treatment step is performed that involves placing the raw PEKK into a shallow pan and heating both within a convection oven. The temperature is ramped up to 200° C. over a one-hour period. The temperature is held at 200° C. for several hours (e.g., 5 or 6 hours). The temperature is ramped up a second time to 225° C. The temperature is held at 225° C. for a minimum of one hour and for preferably between one and four hours. The temperature is then ramped up a third time to 250° C. The temperature is held at 250° C. for a minimum of one hour and for preferably between one and four hours. The temperature of the raw PEKK does not exceed 250° C. during the heat treating step, and thus remains below the melting temperature of the raw PEKK.

The heat treatment step evaporates any remaining liquid solvent and other impurities, and causes at least substantially all of the raw PEKK to be in the form of irregularly-shaped particles. The heat treatment step also causes some coalescence of the irregularly-shaped particles. However, the bulk density of the raw PEKK remains low after the heat treatment step.

The duration and temperature of each heating period during the heat treatment step can be selected based on the expected amount of impurities in the raw PEKK. The total duration of the heat treatment step is directly correlated to the amount (or expected amount) of impurities (e.g., liquid solvent) in the raw PEKK.

Figure 3:
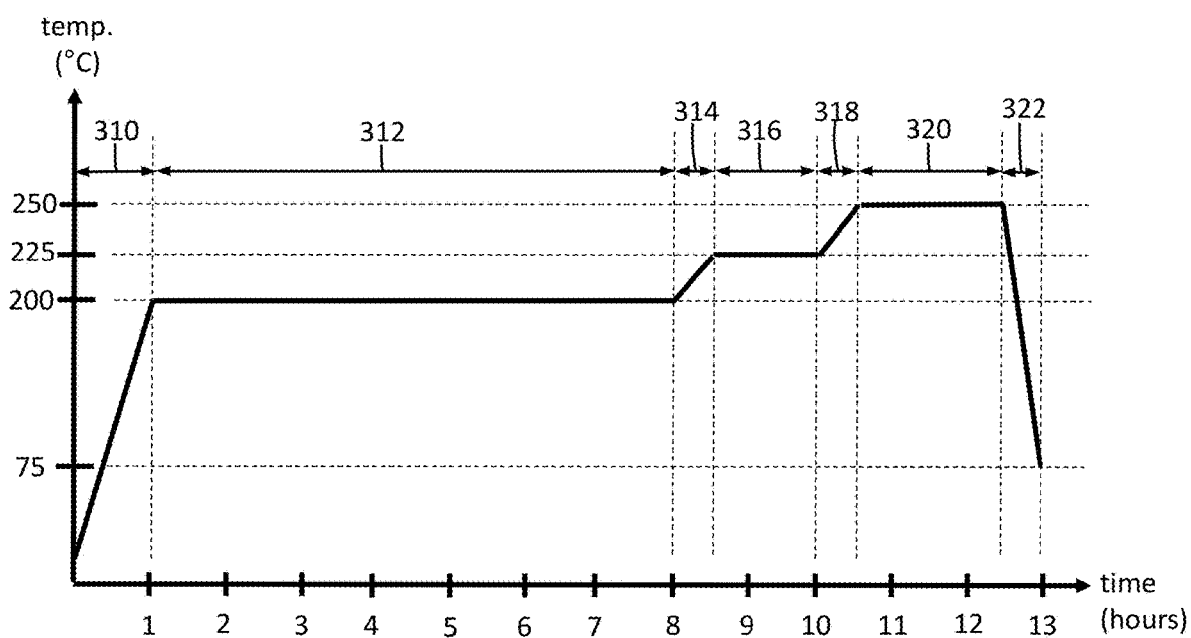
FIG. 3 plots the temperature as a function of time during the heating and cooling steps of an embodiment of the present method.

Referring to FIG. 3, in one embodiment in which the raw PEKK was determined to be approximately 99.75% pure via the ASTM E1868 loss-on-drying testing method, the heat treatment step includes a first heating period 310 having a duration of one (1) hour, during which the temperature of the raw PEKK is ramped up from room temperature to approximately 200° C.; (ii) a second heating period 312 having a duration of seven (7) hours, during which the temperature of the raw PEKK is held at a temperature of approximately 200° C.; (iii) a third heating period 314 having a duration of 0.5 hours, during which the temperature of the raw PEKK is ramped up from approximately 200° C. to approximately 225° C.; (ii) a fourth heating period 316 having a duration of 1.5 hours, during which the temperature of the raw PEKK is held at a temperature of approximately 225° C.; (i) a fifth heating period 318 having a duration of 0.5 hours, during which the temperature of the raw PEKK is ramped up from approximately 225° C. to approximately 250° C.; (ii) a sixth heating period 320 having a duration of two (2) hours, during which the temperature of the raw PEKK is held at a temperature of approximately 250° C.

Figure 4:
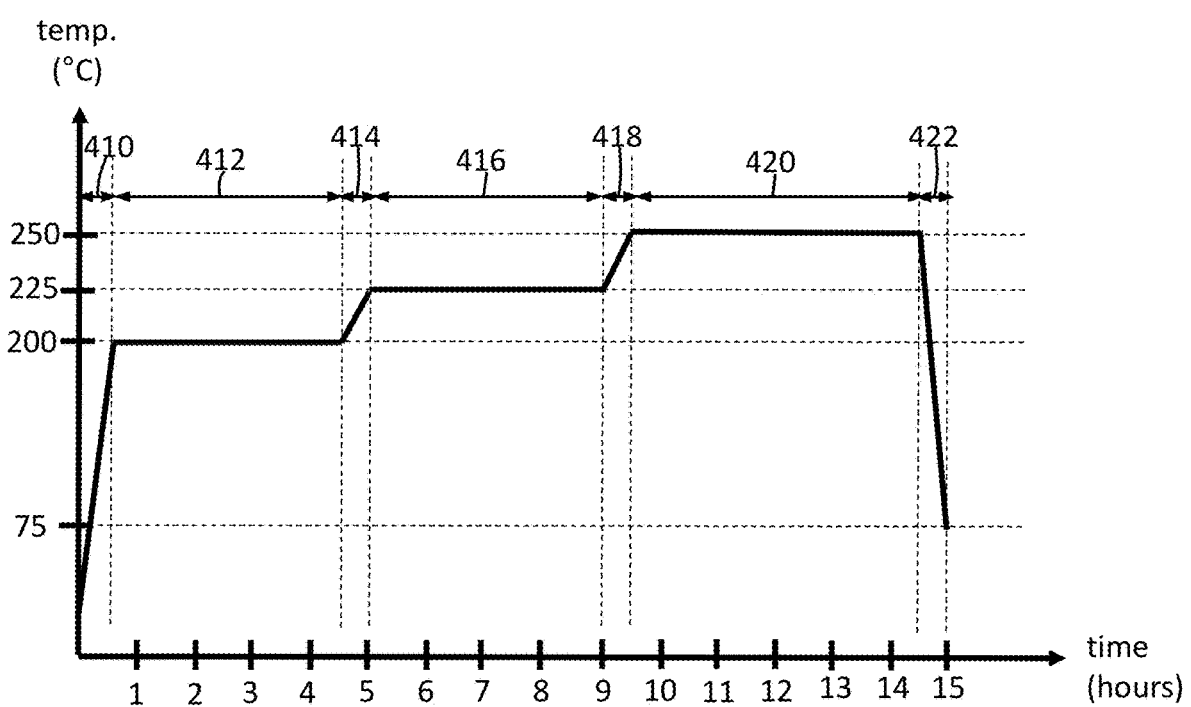
FIG. 4 plots the temperature as a function of time during the heating and cooling steps of another embodiment of the present method.
Figure 5:
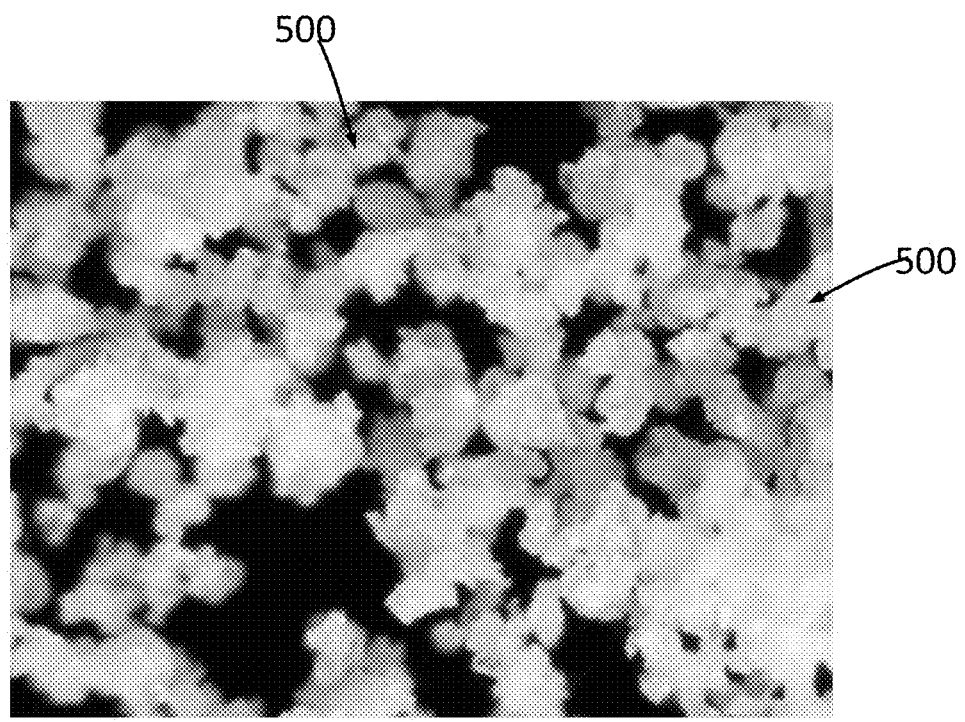
FIG. 5 is a magnified view of a plurality of PEKK particles after the grinding step of the present method.

Referring to FIG. 4, in another embodiment in which the raw PEKK was determined to be approximately 99.5% pure the ASTM E1868 loss-on-drying testing method, the heat treatment step includes: (i) a first heating period 410 having a duration of 0.5 hours, during which the temperature of the raw PEKK is ramped up from room temperature to approximately 200° C.; (ii) a second heating period 412 having a duration of four (4) hours, during which the temperature of the raw PEKK is held at a temperature of approximately 200° C.; (iii) a third heating period 414 having a duration of 0.5 hours, during which the temperature of the raw PEKK is ramped up from approximately 200° C. to approximately 225° C.; (ii) a fourth heating period 416 having a duration of 4 hours, during which the temperature of the raw PEKK is held at a temperature of approximately 225° C.; (i) a fifth heating period 418 having a duration of 0.5 hours, during which the temperature of the raw PEKK is ramped up from approximately 225° C. to approximately 250° C.; (ii) a sixth heating period 420 having a duration of five (5) hours, during which the temperature of the raw PEKK is held at a temperature of approximately 250° C.

After the heat treating step, a cooling step is performed that involves powering-off the convection oven heater and allowing the raw PEKK to cool naturally. In some embodiments, such as those shown in FIGS. 3 and 4, the cooling step involves a cooling period 22 during which the temperature of the oven heater is decreased from approximately 250° C. to 75° C. over the course of 0.5 hours before the raw PEKK is allowed to naturally cool.

After the cooling step, a grinding step is performed that involves grinding the raw PEKK to form what will hereinafter be referred to as the "PEKK powder." The grinding step can be performed using known grinding techniques performed by companies such as Aveka, Inc. of Woodbury, Minn. Upon completion of the grinding step, the particles of the PEKK powder are significantly smaller (i.e., several degrees of magnitude smaller) than the particles of the raw PEKK. The particles of the PEKK powder are more consistent and regular in shape as compared to the particles of the raw PEKK; however, the particles of the PEKK powder are still irregularly-shaped in comparison to the spherical-shaped particles of prior art PEKK powders that are pre-heated as described above. In reference to FIG. 3, a magnified image of irregularly shaped particles 500 produced via the above process is shown.

After the grinding step, an optional processing step is performed that involves sieving or otherwise processing the PEKK powder to eliminate particles having sizes outside a range appropriate for SLS (e.g., 30-150 μm). In some embodiments, the LS composition is formed from PEKK powder and carbon fiber.

The above described milling process and powder preparation process is the subject of co-pending U.S. patent application Ser. No. 15/872,598 filed on Jan. 16, 2018 by Hexcel Corporation and titled "Polymer Powder and Method of Preparing the Same." The disclosure of that reference is hereby incorporated by reference.

Another aspect of the invention is a PEKK powder manufactured according to the above-described method.

In some embodiments, the method can be performed using an SLS machine made by EOS GmbH Electro Optical Systems of Krailling, Germany, such as the EOSINT P 800. In such embodiments, the PEKK powder is placed into an overhead gravity feed hopper and then forced to cascade down (i.e., flow down) several stepped shelves that cause the PEKK powder to be in a form that is not at all packed or tamped down. The PEKK powder is then fed through a recoater that causes the PEKK powder to be provided in a flat, level layer. There is no intentional heating prior to the PEKK powder reaching the workspace. The components of the SLS machine that feed and dose the PEKK powder before it reaches the workspace (e.g., the hopper, the recoater, etc.) can get warm, but this is unintentional and there is no monitoring of such heating.

Figure 6:
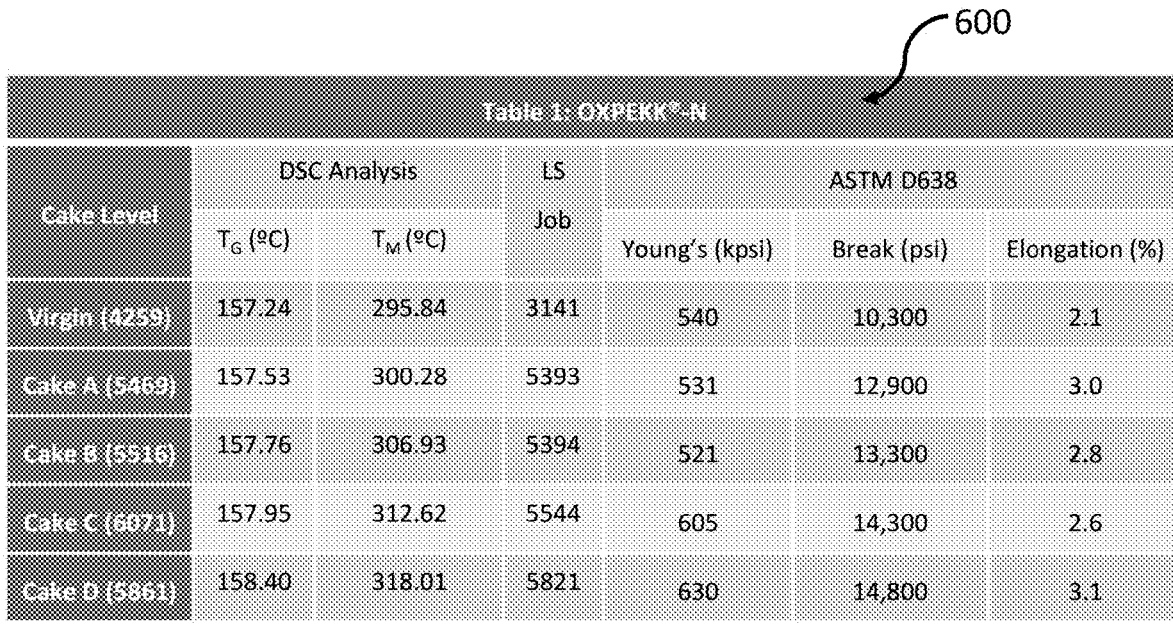
FIG. 6 is a table showing data of a PEKK powder composition excluding carbon fiber.
Figure 7:
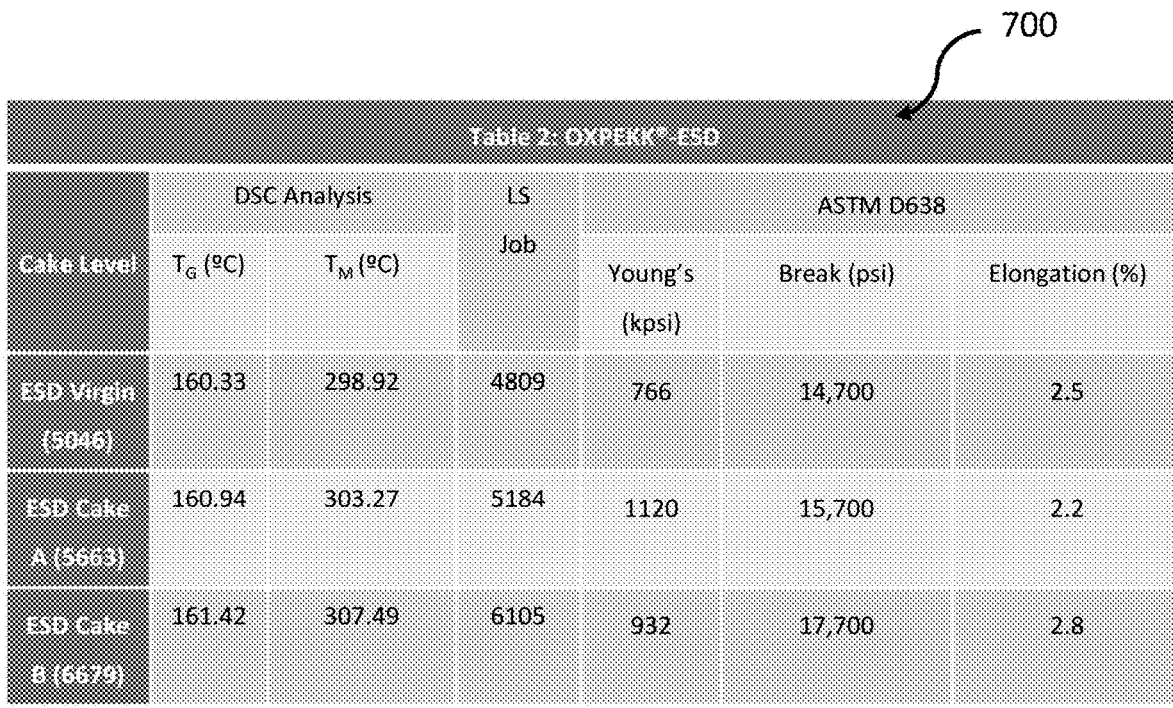
FIG. 7 is a table showing data of a PEKK powder composition including carbon fiber.

In reference to tables shown in FIGS. 6 and 7, a comparison of parts made from a first composition consisting essentially of PEKK powder and a second composition consisting essentially of PEKK powder and carbon fiber prepared in accordance with the presently disclosed method is shown. The powders were sold under the names OXPEKK®-N and OXPEKK®-ESD, wherein N includes PEKK powder and ESD includes PEKK powder blended with carbon fiber. In both cases, the LS cycle affects the physical and chemical properties of the powder, and the tensile properties of parts made from the powder improve with each successive generation. The comparison confirms that parts made with the carbon fibers in accordance with the presently disclosed invention are unequivocally stronger than parts made from pure PEKK powder. In both cases, the raw PEKK flake was treated in accordance with the proposed heat treatment steps and grinding steps.

In reference to FIG. 6, Table 1 600 shows the properties of PEKK powder sold under the brand name OXPEKK®-N from Oxford Performance Materials, Inc. The left column, Cake Level, identifies the number of LS cycles that an OXPEKK®-N powder has been exposed to. Virgin refers to a powder that has not been exposed to LS process, while Cake A has been exposed to 1 LS process, Cake B—2 LS process, etc. Each cake level was subjected to an LS build process that manufactured test rods in the x-plane. The tensile properties were determined pursuant to ASTM D638. The test rods were manufactured in a EOS P 800 sintering machine. The bed temperature was determined in accordance with the method set forth in International Patent Application WO2015031758 for a Method for Analytically Determining SLS Bed Temperature.

In reference to FIG. 7, Table 2 700 shows the properties of ESD PEKK powder sold under the brand name OXPEKK®-ESD from Oxford Performance Materials, Inc. The powder was manufactured in accordance with the above described method. Specifically, consisted essentially of PEKK powder and carbon fiber in a ratio of 85/15 by weight.

The D50 of the powder was between 60 µm and 70 µm and the L50 of the powder was between 70 µm and 80 µm. The particles were substantially non-spherical and the carbon fiber was mixed with the PEKK powder via high intensity mixing to partially embed the fiber into the particles.

The left column, Cake Level, identifies the number of LS cycles that an OXPEKK®-ESD powder has been exposed to. Virgin refers to a powder that has not been exposed to LS process, while Cake A has been exposed to 1 LS process, Cake B—2 LS processes. Each ESD cake level was subjected to an LS build process that manufactured test rods in the x-plane. The tensile properties were determined pursuant to ASTM D638.

The present method offers significant advantages over prior art methods for preparing a PEKK powder. By heat treating raw PEKK and then performing the grinding step to form PEKK powder, as opposed to pre-heating PEKK powder as is typically done in the prior art, the present method achieves a PEKK powder with particles that are irregularly-shaped in comparison to the spherical-shaped particles of prior art PEKK powders. Contrary to conventional wisdom, the irregularly-shaped PEKK powder particles yield enhanced consistency of performance and improved performance over the prior art spherical-shaped particles. The irregularly-shaped PEKK powder particles pack together more rigidly, providing greater bed stability and allowing for better shape accuracy in general. Also, the irregularly-shaped PEKK powder particles are believed to provide more resistance to machine transients that would otherwise cause distortions in the manufactured object. It is also believed that the shapes (e.g., size, shape distributions) of voids created by irregularly-shaped PEKK powder particles versus those of spherical-shaped PEKK powder particles offer a different mode of consolidation, yielding enhanced consistency of performance and possibly improved performance.

The present disclosure describes aspects of the invention with reference to the exemplary embodiments illustrated in the drawings; however, aspects of the invention are not limited to the exemplary embodiments illustrated in the drawings. It will be apparent to those of ordinary skill in the art that aspects of the invention include many more embodiments. Accordingly, aspects of the invention are not to be restricted in light of the exemplary embodiments illustrated in the drawings. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A method for preparing a PEKK powder for use in SLS, the method comprising:
    providing a raw, non-powder PEKK material;
    after the providing step, heat treating the raw PEKK to evaporate a liquid solvent in the raw PEKK, wherein during the heating step the raw PEKK remains below a temperature at which raw PEKK begins to melt;
    after the heat treating step, cooling the raw PEKK; and
    after the cooling step, grinding the raw PEKK to form a PEKK powder;
    wherein after the heating step the raw PEKK has a purity greater than 99.75% as determined by the ASTM E1868 loss-on-drying test method.

2. The method of claim 1, further comprising sieving the PEKK powder to eliminate particles having sizes outside a range of 30-150 µm.

3. The method of claim 1, wherein before the heat treating step, the raw PEKK is of a gel form.

4. The method of claim 1, wherein the temperature of the raw PEKK does not exceed 250° C. during the heat treating step.

5. The method of claim 1, wherein the heat treating step includes:
    (i) a first heating period during which the temperature of the raw PEKK is ramped up from room temperature to approximately 200° C.;
    (ii) a second heating period during which the temperature of the raw PEKK is held at a temperature of approximately 200° C.

6. The method of claim 5, wherein the heat treating step further includes:
    (iii) a third heating period during which the temperature of the raw PEKK is ramped up from approximately 200° C. to approximately 225° C.;
    (iv) a fourth heating period having a duration of at least one hour, during which the temperature of the raw PEKK is held at a temperature of approximately 225° C.

7. The method of claim 6, wherein the heat treating step further includes:
    (v) a fifth heating period during which the temperature of the raw PEKK is ramped up from approximately 225° C. to approximately 250° C.;
    (vi) a sixth heating period having a duration of at least one hour, during which the temperature of the raw PEKK is held at a temperature of approximately 250° C.

8. The method of claim 7, wherein the first heating period has a duration of one hour, the second heating period has a duration of seven (7) hours—the third heating period has a duration of 0.5 hours, the fourth heating period has a duration of 1.5 hours the fifth heating period has a duration of 0.5 hours and the sixth heating period has a duration of two (2) hours.

9. The method of claim 7, wherein the first heating period has a duration of 0.5 hours, the second heating period has a duration of four (4) hours, the third heating period has a duration of 0.5 hours, the fourth heating period has a duration of 4 hours, the fifth heating period has a duration of 0.5 hours and the sixth heating period has a duration of five (5) hours.

10. The method of claim 1, wherein the heat treating step involves placing the raw PEKK into a pan and heating both the raw PEKK and the pan within a convection oven.

11. The method of claim 1, wherein the cooling step is performed by allowing the raw PEKK to cool only naturally.

12. The method of claim 1, wherein the heating step causes coalescence of the particles of the raw PEKK.

13. A PEKK powder manufactured according to a method comprising:
    providing a raw, non-powder PEKK material;
    after the providing step, heat treating the raw PEKK to evaporate at least substantially all of a liquid solvent in the raw PEKK, causing at least substantially all of the raw PEKK to be in the form of irregularly-shaped particles;
    after the heat treating step, cooling the raw PEKK; and
    after the cooling step, grinding the raw PEKK to form a PEKK powder.

14. A method for preparing a PAEK powder for use in LS, the method comprising:

providing a raw, non-powder PAEK material;

after the providing step, heat treating the raw PAEK to evaporate a liquid solvent in the raw PAEK wherein during the heating step the raw PEKK remains below a temperature at which raw PEKK begins to melt;

after the heat treating step, cooling the raw PAEK; and after the cooling step, grinding the raw PAEK to form a PAEK powder, wherein after the heating step the raw PEKK has a purity greater than 99.75% as determined by the ASTM E1868 loss-on-drying test method.

15. The method of claim 1, wherein the heat treating step includes:

(i) a first heating period during which the temperature of the raw PEKK is held at a temperature between approximately 200° C. and approximately 250° C.

16. The method of claim 15, where the first heating period has a duration of at least ten hours.

\* \* \* \* \*